Dec. 20, 1966 R. MATTHEWS 3,292,768
APRICOT FEEDER
Filed March 10, 1965

INVENTOR.
RUDOLPH MATTHEWS
BY
ATTORNEYS

United States Patent Office 3,292,768
Patented Dec. 20, 1966

3,292,768
APRICOT FEEDER
Rudolph Matthews, Oakland, Calif., assignor to Atlas Pacific Engineering Company, a corporation of California
Filed Mar. 10, 1965, Ser. No. 438,516
8 Claims. (Cl. 198—34)

This invention relates to a feeding mechanism for fruit and more particularly relates to a device wherein fruit which varies greatly in size such as peaches, apricots or apples is fed into a subsequent processing device. The present invention relates to a device wherein one fruit at a time is fed into each compartment of a subsequent processing device. In the description of the invention which follows, it is assumed that apricots are being fed, one at a time, into an orienting device wherein it is essential that only one fruit be fed in each pocket of the orienting device. However, it will be understood that this is only for purposes of illustration, and that the invention is one of wide application and is suitable for any use wherein it is desired to have an article of generally spherical form fed into a machine one at a time.

Other feeder devices have been proposed in the past, but such devices have ordinarily been of complex mechanical structure and have also had a tendency to overfeed so that more than one article might be placed in each compartment or to underfeed and thereby reduce the efficiency of the machine.

It is therefore an object of the present invention to provide a high speed mechanical feeder for fruit and the like which is simple in construction.

Another object of this invention is to provide a device which is almost foolproof in its operation, so that it is virtually impossible for more than one fruit to be fed at a time.

Still another object of this invention is to provide a feeding device capable of operating at high rates of speed.

Still another object is to provide a feeding device which will eject surplus fruit without damage when overfed.

Other objects will be apparent from the balance of the specification.

In the drawings forming a part of this application:

Figure 2:
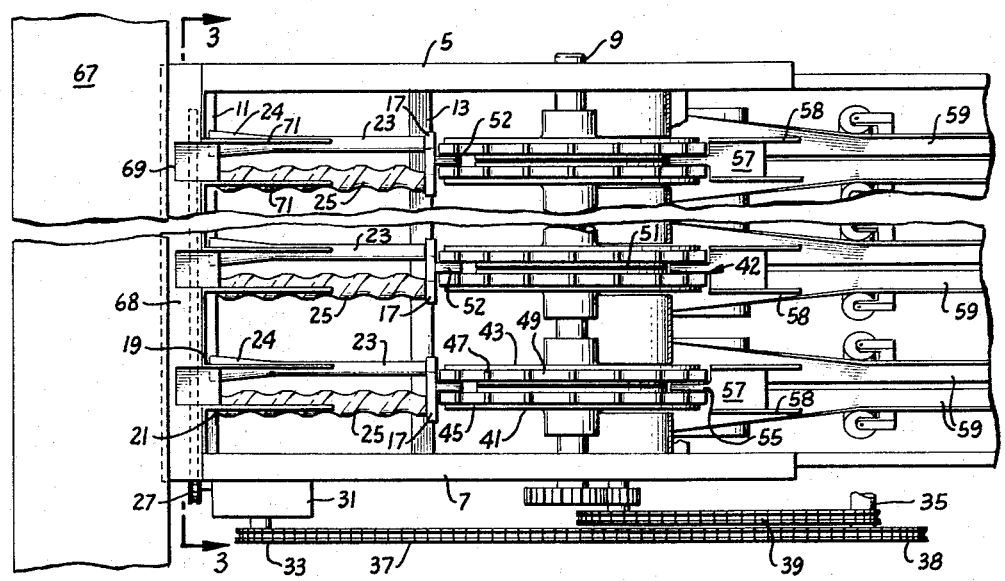
FIGURE 2 is a plan view of the device shown in FIGURE 1.
Figure 1:
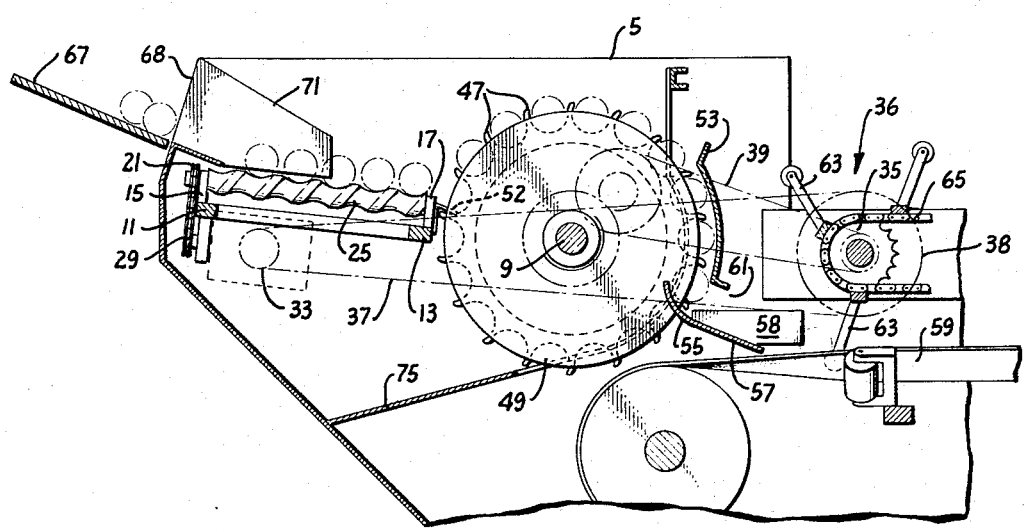
FIGURE 1 is a side view of a device embodying the present invention with certain parts cut away to show more clearly the internal structure.
Figure 3:
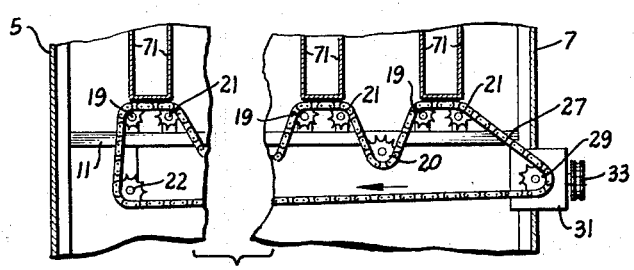
FIGURE 3 is a view on the line 3—3 of FIGURE 2.

Turning now to a description of the drawings by reference characters, the device includes side frame members 5 and 7, having a shaft 9 journaled for rotation therebetween. Cross frame members 11 and 13 extend crosswise of the machine and are supported by the side frame members. The cross frame members 11 and 13 in turn support bearing members 15 and 17, each of which has a plurality of bearings supporting a plurality of pairs of feed shafts. One pair of feed shafts is employed for each feeding lane, it being understood that the device of the present invention can be built with any desired number of lanes.

Each pair of feed shafts comprises a first shaft 19 and a second shaft 21. The first shaft 19 comprises a smooth portion 23 having an outwardly tapering end 24 at the feed end to urge the fruit forward in the chute 71. The second shaft 21 has an outer surface in the form of a worm. The lead of the worm 25 is a little more than the diameter of the largest fruit to be handled. The shafts are close enough together so that the smallest fruit does not fall through and yet the largest fruit is adequately supported when it is properly nested in the worm groove so that it does not fall off. The diameter of the worm is not critical but should be proportioned to the fruit being run. The slope of the worms is such that the fruit is urged forward by the slope as the shafts rotate so that the worm is holding the fruit back rather than forcing the fruit forward. The slope should not be so great that the fruit tends to jump forward from a worm groove when it is properly nested in the groove. In the case of apricots ranging from about 1¼" to 2¼" in diameter, a worm 1½" in diameter with a lead of 2⅜" and a root diameter of ⅞" was used. The plain shaft had a ⅞" diameter and was spaced 2" from the worm center to center. A slope of 5 to 8° was used with this worm configuration. The hand of the worms is relatively unimportant providing they are turned in the proper direction; the arrangement shown with a left hand worm and the plain roll to the left when viewed from the feed end tends to eject doubles better than a right hand worm in the same position and turning in the opposite direction. For driving the shafts, an endless chain 27 is provided which is driven by sprocket 29 through gear box 31, which in turn has a driving sprocket 33. Suitable idler sprockets 20 and 22 are employed. In this manner, the rollers are driven in the same direction so that the fruit is advanced from the belt 67 end towards the wheel 42. In the embodiment shown, sprocket 33 and shaft 9 are driven by sprockets 35 and 38 through endless chains 37 and 39 so that the shafts 19, 21 and 9 are driven in synchronism. In this embodiment, the sprockets 35 and 38 are located on an orienting mechanism generally designated 36, but it will be understood that this is only one application of the feed mechanism and that it is not necessary to drive the feed mechanism from an orienting device. Dual worms will function in the same manner but are more costly than one plain and one grooved shaft.

Mounted on the shaft 9 is a plurality of composite feed wheels generally designated 42, each of which comprises segments 41 and 43 with a space 51 between them. Each segment has an upstanding rim 45 and a series of half pockets formed therein by means of the separators 47. The separators on adjacent segments are in line with each other so that a plurality of pockets 49 is formed. Each of the pockets is of sufficient size to accommodate the largest single fruit, and, since the separation 51 is considerably smaller than the diameter of the fruit, there is no tendency for the fruit to fall between the segments. Tongue 52 attached to bearing member 17 extends into space 51 and supports the fruit entering pockets 49. The periphery of the composite feed wheel 42 is located as near as possible to the ends of the shafts 19 and 21 and is centered on the space between the shafts. The depth of the pockets 49 is slightly greater than the radius of the largest fruit so that the large fruit is lifted and carried around the wheel. At the same time, a fruit half the diameter of the large fruit will occupy the full depth of the pocket so that there is not enough of the separator 47 projecting to lift a second small fruit should there be two small fruits in one worm groove. The second fruit will fall off onto pan 75 for recovery elsewhere.

Mounted on the discharge side of each composite wheel is a shield 53 which prevents fruit from falling out of the pockets prior to the desired time. Near the bottom of the discharge side, a tongue 55 extends upwardly into the space 51 between the wheel segments so that as fruit passes the tongue, it is positively dislodged from the pocket, whereupon it can roll down the ramp 57 onto endless belts 59. Side walls 58 on the ramps keep the fruit in the desired path. The space 61 between the bottom of shield 53 and ramp 57 is of just sufficient size to allow the largest fruit to pass. Thus, by the combined action of the shield 53 and the tongue 55, the fruit is positively dislodged and allowed to roll onto the belt. In the embodiment shown, a plurality of orienting devices 63 are moved by endless chains 65 over belts 59 so that adjacent orienting devices 63 form pockets therebetween. By synchronizing the feed and orienting devices, one fruit is discharged into each pocket thus formed.

At the feed end of the worm shafts feed belt 67 is provided which is inclined at an angle sufficient to cause the fruit to follow along wall 68 and enter opening 69 as they pass. In the case of apricots an angle of 15°–20° is suitable. The openings 69 lead into troughs 71 which are located above and concentric with the space between the rollers 21 and 23. As fruit is conveyed by the endless belt 67, it tends to roll through the openings 69 and troughs 71 onto the space between adjacent rollers. The space between the walls of trough 71 may be made adjustable to handle a given range in fruit size.

The fruit on belt 67 may be more than one layer of fruit in depth; as a result the fruit may enter chute 71 two or more deep. The hold back action of the worm 25 tends to resist the fruit pressure from belt 67 so that the pile up of fruit normally does not extend to the ends of chute 71. The hold back action of the worm is such that if the worms 25 were not turning, no more fruit would enter chutes 25. The turning of worms 25 carries the lower fruit at the downstream end of the pile forward and the fruit above drops in behind until the pile up is relieved. If the pile up should continue past the ends of chute 71, the upper layer of fruit falls off onto pan 75 which returns it to the feeding point or other collecting means. Thus the fruit approaching the wheels 42 is never more than one layer deep. In the event that two of the smallest fruits manage to remain in one worm groove, one behind the other, the depth of pockets 49 is such that only the forward fruit is picked up and the second one is lifted partially so that it is free to fall laterally onto pan 75. Thus, wheel 42 becomes the second stage of separation effectively preventing more than one fruit to be delivered at a time.

By combining an inclined belt, a worm and a pocket wheel it is possible to take fruit from a random jumble and deliver one fruit at a time. In handling fruit of almost uniform size, i.e. fruit which does not vary more than about 25% in size, the worm acting with the belt feed does an excellent job. Thus, in some instances the pocketed wheels could be eliminated and the fruit fed directly from the worm to a subsequent operation. However, in the case of apricots, it is not unusual to encounter about 100% size variation from the smallest to largest. With fruit having this amount of variation, the use of the pocketed wheel becomes essential. It is virtually impossible for more than one fruit to be fed at a time and the combination provides a means of feeding the fruit at exactly the desired time.

I claim:

1. A feeder for fruit or similar articles comprising in combination:
   (a) an inclined feed belt having a discharge edge,
   (b) a pair of spaced parallel feed rollers having a feed end and a discharge end, the feed end being adjacent to said edge of said belt and the rollers being inclined downwardly therefrom,
   (c) at least one of said rollers having a spiral surface,
   (d) aligned bearing support means for and supporting said rollers at the ends thereof for rotation on axes parallel throughout the length of the rollers,
   (e) means in operative adjacency to said discharge end of the rollers for receiving articles therefrom comprising a peripherally pocketed circular body mounted for rotation on an axis perpendicular to the axes of said rollers, the said peripheral pockets moving in a circular path in a vertical plane passing between the pair of rollers, and
   (f) means for rotating said rollers in the same direction.

2. A feeder according to claim 1, wherein:
   (a) the other one of said rollers is of substantially circular cross section and of conical formation in a portion of its length from the feed end with the base of the cone toward said belt.

3. A feeder according to claim 1, wherein:
   (a) said pocketed circular body has an encircling groove dividing said pockets in said plane, and
   (b) means extending into said groove upon the opposite side of the pocketed body from said rollers for positively removing articles from the pockets.

4. A feeder for fruit or similar articles, comprising in combination:
   (a) an inclined feed belt having a discharge edge,
   (b) upwardly projecting wall means extending along said edge of the belt and having a discharge opening therein,
   (c) a pair of spaced parallel feed rollers having a feed end and a discharge end, the feed being adjacent to the lower part of said wall forwardly of said belt edge and substantially aligned with the opposite sides of said discharge opening and the rollers being inclined downwardly from said wall,
   (d) rearward and forward bearing support means for rearward and forward ends of said rollers,
   (e) at least one of said rollers having a spiral surface,
   (f) said rollers being supported by said bearing means for rotation on axes parallel throughout the length of the rollers.
   (g) a wheel unit supported adjacent to the said discharge end of said rollers for rotation on an axis perpendicular to the rollers.
   (h) said wheel unit having its periphery closely adjacent to the said discharge ends of said rollers and having peripheral pockets to receive articles from the discharge ends of the rollers,
   (i) means for rotating said rollers in the same direction, and
   (j) trough forming means extending longitudinally of said rollers from said wall, comprising spaced parallel walls each extending from one side of said first wall opening above and substantially in the vertical plane of a roller,
   (k) said parallel walls having a length materially shorter than the length of the rollers, whereby top articles of a double layer entering said trough will fall off laterally before reaching the said wheel pockets.

5. A feeder according to claim 4, wherein:
   (a) said wheel unit pockets are divided by a circumferential peripheral channel in said wheel, and
   (b) a tongue means extends forwardly from said forward bearing support means into said channel to carry articles from said rollers into said pockets.

6. A feeder according to claim 5,
   (a) with means at the side of the wheel opposite from said tongue for dislodging articles from said pockets.

7. A feeder according to claim 6, wherein:
   (a) the last said means consists of a tongue member projecting into said wheel channel to engage the undersides of articles in the pockets.

8. A feeder for round fruit or like articles comprising in combination:
   (a) an inclined belt feed means,
   (b) a pair of elongate, parallel feed rollers one of which has a screw thread design and the other has a varied diameter design, the rollers having a feed end adjacent to said belt feed means and a discharge end,
   (c) a vertical rotor receiver comprising a pair of spaced coaxial plates, each having an upstanding rim and separators arranged in a circle on their opposing faces and spaced in alignment in the direction of the rotational axis of the receiver to form a circular arrangement of article receiving pockets divided in a vertical plane passing between said plates, (d) said rotor being positioned to receive articles in the said pockets from the discharge end of the pair of rollers, and (e) means at the opposite side of said rotor from the feed rollers disposed in the space between said plates for effecting discharge of articles from said divided pockets.

References Cited by the Examiner

UNITED STATES PATENTS

| 3,126,087 | 3/1964 | Anderson | 198—34 |
| 3,180,478 | 4/1965 | Stanley | 198—34 |

EVON C. BLUNK, *Primary Examiner.*

EDWARD A. SROKA, *Examiner.*